United States Patent [19]
Trepanier et al.

[11] 3,919,220
[45] Nov. 11, 1975

[54] 6-(PHENYL AND SUBSTITUTED PHENYL)TETRAHYDRO-1,2,4-TRIAZINOQUINAZOLINES

[75] Inventors: Donald L. Trepanier; Shyam Sunder, both of Midland, Mich.

[73] Assignee: The Dow Chemical Company, Midland, Mich.

[22] Filed: Nov. 4, 1974

[21] Appl. No.: 520,702

[52] U.S. Cl. .................... 260/248 AS; 424/249
[51] Int. Cl.² ................................ C07D 253/08
[58] Field of Search ...................... 260/248 AS

[56] References Cited
UNITED STATES PATENTS
3,873,543  3/1975  Berenyi et al. .................... 260/248

Primary Examiner—John M. Ford
Attorney, Agent, or Firm—Maynard R. Johnson

[57] ABSTRACT

Triazinoequinazoline compounds such as 3,4,6,7-tetrahydro-2-methyl-6-(4-chlorophenyl)-2H-1,2,4-triazino[4,3-c]quinazoline are prepared by the reaction of 3-(2-aminophenyl)-methyl-1,4,5,6-tetrahydro-1,2,4-triazine with an aldehyde or ketone. The compounds have pharmacological activity on the central nervous system, and can also be used as intermediates for the corresponding dihydro compounds.

6 Claims, No Drawings

6-(PHENYL AND SUBSTITUTED PHENYL)TETRAHYDRO-1,2,4-TRIAZINOQUINAZOLINES

SUMMARY OF THE INVENTION

This invention is concerned with triazinoquinoline compounds and is particularly directed to 6-substituted 3,4,6,7-tetrahydro-1,2,4-triazino[4,3-c]quinazoline compounds of the formula I 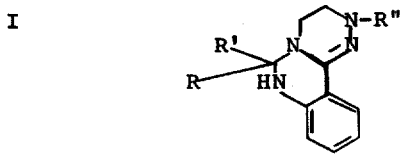

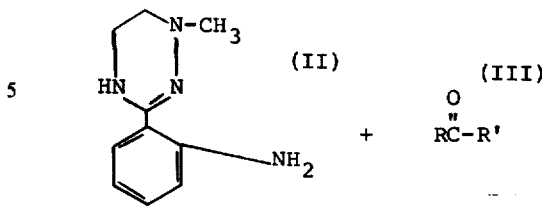

and their pharmaceutically acceptable acid addition salts. In the above formula, and elsewhere in the present specification, R represents phenyl, naphthyl, acetamidophenyl or substituted phenyl having one, two or three substituents selected from nitro, halo, hydroxy, cyano, loweralkyl, loweralkoxy, amino, or mono-or diloweralkylamino; R' represents hydrogen or loweralkyl and R'' represents loweralkyl.

The term "halo" as herein employed refers to fluoro, chloro and bromo. The terms "loweralkyl" and "loweralkoxy" refer to such moieties having 1, 2 or 3 carbon atoms. The term "pharmaceutically-acceptable salt" as herein employed refers to salts which are substantially non-toxic at dosage rates consistent with good pharmacological activity. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

The compounds are crystalline solids at ordinary temperatures. The compounds have pharmacological activity, and can be administered to animals in the study of chemical effects on the central nervous system and respiratory tract. In particular the compounds can be used as anti-depressants, barbiturate potentiators, anorectics, analgesics, or histamine antagonists, as indicated by their activity in standard pharmacological evaluation procedures. The type and degree of pharmacological activity typically varies somewhat according to such factors as specific compound employed, dosage rate, dosage route, and size, age and species of animal and effect to be produced.

For pharmacological use compounds wherein R is mono-or dihalophenyl or mononitrophenyl, R' is hydrogen and R'' is methyl are preferred.

PREPARATION OF THE TRIAZINOQUINAZOLINES

The compounds of the invention are prepared by the reaction of a 3-(2-aminophenyl)-1-loweralkyl-1,4,5,6-tetrahydro-1,2,4-triazine of Formula II with an aldehyde or ketone of Formula III to obtain the corresponding 6-substituted-3,4,6,7-tetrahydro-2-loweralkyl-2H-1,2,4-triazino [4,3-c]quinazoline of Formula I.

In the above formulae R, R' and R'' have the significance set out above with respect to Formula I.

The reaction of the aminophenyltriazine and the aldehyde or ketone proceeds when the reactants are contacted and mixed, in the presence of an inert organic solvent as a reaction medium and, when a ketone reactant is employed, in the presence of an acid catalyst such as p-toluenesulfonic acid. Suitable inert solvents include alkanols when an aldehyde reactant is used or benzene when a ketone is used. The reaction proceeds at temperatures from about 25° to the boiling temperature of the mixture. It is generally desirable to heat the reaction mixture at the boiling temperature under reflux. The reaction is generally complete within about 2 to about 24 hours, depending upon temperature and choice of solvent and aldehyde. When a ketone is employed the benzene solution containing a catalytic amount of an organic acid such as p-toluene sulfonic acid is heated under reflux and the water separated by means of a Dean-Stark water trap. The appropriate amount of water is usually collected in from four to eighteen hours signifying the reaction has gone to completion.

The product can be separated by conventional procedures, such as evaporation of reaction medium and unreacted aldehyde or ketone or cooling and neutralization of the reaction mixture to induce crystallization of the compound, followed by filtration. The product can be purified by conventional procedures such as recrystallization and washing.

The exact proportions of the reactants to be employed are not critical, some of the desired product being obtained when the rectants are combined over a wide range of proportions. The reaction consumes the reactants in equimolar proportions and in a preferred procedure, the reactants are employed in proportions from substantially equimolar amounts of each reactant to about 10 percent molar excess of either reactant.

The pharmaceutically-acceptable salts are conveniently prepared by dissolving the free base compound in a solvent such as diethyl ether and thereafter adding an excess of a pharmaceutically-acceptable acid such as hydrochloric, hydrobromic, sulfuric, malic, maleic or p-toluenesulfonic acid or the like until precipitation of the product is complete. The product can be separated by conventional procedures such as evaporation, filtration or centrifugation and purified by conventional procedures such as recrystallization.

Compounds of the invention can be used for pharmacological purposes or as intermediates in the sulfur catalyzed dehydrogenation of the 3,4,6,7-tetrahydro-triazino [4,3-c]quinazoline by heating with about a 5 to 10 fold molar excess of sulfur in dichlorobenzene to obtain the corresponding 3,4-dihydro-triazino [4,3-c]quinazoline.

DESCRIPTION OF PREFERRED EMBODIMENTS

The following examples illustrate the invention but are not to be construed as limiting the same.

EXAMPLE 1

5.7 Grams of 3-(2-aminophenyl)-1-methyl-1,4,5,6-tetrahydro-1,2,4-triazine and 5 grams 3,4-dichlorobenzaldehyde are dissolved in minimal ethanol and the mixture is stirred at room temperature (about 25°C.) for about 18 hours. The ethanol is removed by filtration; and the product obtained as a filter cake. The product is recrystallized from ethanol. The 6-(3,4-dichlorophenyl)-2-methyl-3,4,6,7-tetrahydro-2H-1,2,4-triazino[4,3-c] quinazoline product is found to melt at 189°–190°C. Elemental analysis shows carbon, hydrogen and nitrogen contents of 58.85, 4.74 and 15.83 percent, respectively, as compared to calculated contents of 58.79, 4.64 and 16.13 percent, respectively.

EXAMPLE 2

5.7 Grams of 3-(2-aminophenyl)-1-methyl-1,4,5,6-tetrahydro-1,2,4-triazine and 5.0 grams 4-fluorobenzaldehyde are dissolved in minimal ethanol and the mixture is heated on a steam bath for 15–20 minutes. The ethanol is removed by filtration; and the residue is recrystallized from ethanol. The 6-(4-fluorophenyl)-2-methyl-3,4,6,7-tetrahydro-2H-1,2,4-triazino[4,3-c]quinazoline product is found to melt at 224°–226°C. Elemental analysis shows carbon, hydrogen and nitrogen contents of 69.01, 6.00 and 18.61 percent, respectively, as compared to calculated contents of 68.89, 5.78 and 18.90 percent, respectively.

EXAMPLE 3

5.7 Grams of 3-(2-aminophenyl)-1-methyl-1,4,5,6-tetrahydro-1,2,4-triazine, 1 gram 4-toluenesulfonic acid, and 3.6 grams 4-fluoroacetophenone are dissolved in 250 milliliters benzene and the mixture is heated at the boiling temperature under reflux for about 18 hours in a vessel equipped with a Dean-Stark trap. The mixture is cooled, neutralized by washing with dilute aqueous sodium hydroxide, then washed with water, dried and evaporated under reduced pressure. The residue is recrystallized from ethanol. The 6-(4-fluorophenyl)-2,6-dimethyl-3,4,6,7-tetrahydro-2H-1,2,4-triazino[4,3-c]quinazoline product is found to melt at 198.5°–200°C. Elemental analysis shows carbon, hydrogen and nitrogen contents to 69.72, 6.31 and 18.05 percent, respectively, as compared to calculated contents of 69.65, 6.17 and 18.20 percent, respectively.

EXAMPLE 4

5.7 Grams of 3-(2-aminophenyl)-1-methyl-1,4,5,6-tetrahydro-1,2,4-triazine, 1 gram 4-toluenesulfonic acid and 3.6 grams acetophenone are dissolved in 250 milliliters benzene and the mixture is heated at the boiling temperature under reflux for about 18 hours in a vessel equipped with a Dean-Stark trap. The mixture is washed with dilute aqueous sodium hydroxide, then washed twice with water, then evaporated under reduced pressure. The residue is recrystallized from ethanol. The 6-phenyl-2,6-dimethyl-3,4,6,7-tetrahydro-2H-1,2,4-triazino[4,3-c]quinazoline product is found to melt at 206°–208°C. Elemental analysis confirms the structure.

EXAMPLE 5

The compounds listed below are prepared in procedures similar to those of Examples 1-4. In the compounds tabulated below, R'' is methyl.

TABLE

| R | $R_1$ | Mp, °C | Calcd. C | H | N | Found C | H | N |
|---|---|---|---|---|---|---|---|---|
| $C_6H_5$ | H | 204–205* | 73.35 | 6.51 | 20.13 | 73.61 | 6.71 | 19.97 |
| 4-$(CH_3)_2NC_6H_4$ | H | 208–210* | 70.99 | 7.21 | 21.79 | 70.20 | 7.52 | 21.32 |
| 3,4-$(CH_2O)_2C_6H_3$ | H | 172–178 | 67.43 | 6.55 | 16.55 | 67.68 | 6.73 | 16.78 |
| 3,4-$(O_2N)_2C_6H_3$ | H | 213–214 (dec.) | 55.42 | 4.38 | 22.81 | 55.13 | 4.56 | 22.55 |
| 2-$HOC_6H_4$ | H | 156–158 | 69.36 | 6.16 | 19.03 | 62.93 | 6.40 | 19.17 |
| 4-$HOC_6H_4$ | H | 223–224 | 69.36 | 6.16 | 19.03 | 69.60 | 6.12 | 19.31 |
| 4-$CH_3CONHC_6H_4$ | H | 123–124.5 | 68.03 | 6.31 | 20.80 | 67.32 | 6.69 | 20.33 |
| 4-$O_2NC_6H_4$ | H | 227–228 | 63.14 | 5.30 | 21.66 | 63.58 | 5.30 | 21.84 |
| 3,4,5-$(CH_3O)_3C_6H_2$ | H | 189–191 | 65.19 | 6.56 | 15.21 | 65.47 | 6.26 | 15.35 |
| 4-$HOC_6H_4$ | $CH_3$ | 238–240 | 70.10 | 6.53 | 18.16 | 69.94 | 6.80 | 18.10 |
| 4-$(CH_3)_2CHC_6H_4$ | H | 190–191* | 74.96 | 7.55 | 17.48 | 75.23 | 7.32 | 17.56 |
| 2-Naphthyl | $CH_3$ | 193–194 | 77.16 | 6.47 | 16.36 | 77.24 | 6.63 | 16.47 |
| 4-$FC_6H_4$ | $CH_3$ | 198.5–200 | 60.65 | 6.17 | 18.20 | 69.72 | 6.31 | 18.05 |
| 4-$Et_2N(CH_2)_2OC_6H_4$ | H | 151.5–153* | 70.19 | 7.94 | 17.79 | 70.47 | 7.66 | 17.93 |

*Recrystallized from isopropanol; all others recrystallized from ethanol.

In standard pharmacological evaluation procedures, (See, e.g., U.S. Pat. Nos. 3,641,019 and 3,485,921) the compound of Example 5 wherein R is 4-hydroxyphenyl and R' is hydrogen is found to block histamine induced contraction of isolated guinea pig trachea at a concentration of 120 milligrams per liter. The compounds of Example 5 wherein R is 2-hydroxyphenyl and R' is hydrogen is found to extend hexobarbital induced sleep in mice by a factor of at least two, when the test compounds are administered intraperitoneally at 60 milligrams per kilogram 30 minutes before hexobarbital. The compounds of Examples 1 and 2, and of Example 5 wherein R is 4-dimethylaminophenyl, 4-acetamidophenyl, 4-nitrophenyl are found to inhibit reserpine induced ptosis in mice at an equivalent dosage rate.

Compounds of the invention wherein R' is hydrogen can be dehydrogenated as illustrated in the following procedure:

A mixture of 5.7 grams 2-methyl-6-phenyl-3,4,6,7-tetrahydro-2H-1,2,4-triazino[4,3-c]quinazoline, 1.2 grams sulfur, 50 milliliters 1,2-dichlorobenzene, and 25 milliliters benzene is heated in an oil bath at 180° for 1 hour. The cooled, red colored mixture is extracted with dilute aqueous hydrochloric acid. The cooled acid extract is basified with cold aqueous sodium hydroxide and extracted with methylene chloride. The methylene chloride extract is washed with water, dried over magnesium sulfate, and evaporated in vacuo. The residual yellow solid is recrystallized twice from isopropyl alcohol to provide 3,4-dihydro-2-methyl-6-phenyl-2H-1,2,4-triazino[4,3-c]quinazoline melting at 143°–144°C. This compound is found active in potentiating hexobarbital induced sleep in mice.

The 2-aminophenyl triazine starting material can be prepared by reacting 2-aminophenyl cyanide with hydrogen sulfide in pyridine and triethylamine to obtain 2-aminophenylthiobenzamide, and then reacting the thiobenzamide with a 1-loweralkyl-1-(2-aminoethyl)-hydrazine. For example, 100 grams of 2-aminophenyl cyanide in a mixture of 500–600 milliliters of pyridine and 100 milliliters triethylamine is stirred at about 25°C. while hydrogen sulfide is passed through the mixture for 3 hours. The product is separated, and 4 grams of the product are mixed with 1.8–2.0 grams 1-methyl-1(2-aminoethyl)hydrazine for 2 hours at about 100°–120°C. to drive off hydrogen sulfide of reaction ethanol is added and the mixture is boiled for 30 minutes under reflux, cooled, diluted with ether until a precipitate forms, and filtered. The aminophenyl triazine filter cake is recrystallized from isopropanol and found to melt at 140°–141°C.

What is claimed is:

1. A 1,2,4-triazino quinazoline selected from compounds corresponding to the formula:

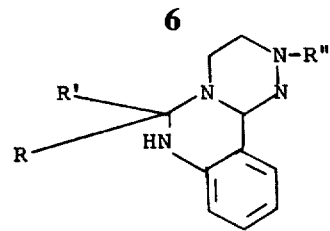

wherein R represents phenyl, naphthyl, acetamidophenyl, or substituted phenyl having one, two or three substituents selected from nitro, halo, hydroxy, cyano, loweralkyl, loweralkoxy, amino, or mono- or diloweralkyl amino, R' represents hydrogen or loweralkyl and R" represents loweralkyl in which, in all occurrences thereof; the loweralkyl and loweralkoxy moieties are of one to three carbon atoms, and their pharmaceutically-acceptable acid addition salts.

2. A compound of claim 1 wherein R' represents hydrogen.

3. A compound of claim 2 wherein R" represents methyl.

4. A compound of claim 3 wherein R is mono- or dihalophenyl.

5. A compound of claim 3 wherein R is phenyl.

6. A compound of claim 3 wherein R is hydroxyphenyl.

* * * * *